United States Patent
Jacobs et al.

(10) Patent No.: US 7,040,691 B1
(45) Date of Patent: May 9, 2006

(54) VEHICLE FLOOR TUB HAVING A LAMINATED STRUCTURE

(75) Inventors: Jon E. Jacobs, Ann Arbor, MI (US); James R. Schwaegler, Canton, MI (US)

(73) Assignee: Material Sciences Corporation, Elk Grove, IL (US)

( * ) Notice: Subject to any disclaimer, the term of this patent is extended or adjusted under 35 U.S.C. 154(b) by 0 days.

(21) Appl. No.: 11/005,236

(22) Filed: Dec. 6, 2004

(51) Int. Cl.
*B60R 27/00* (2006.01)
(52) U.S. Cl. .................................. 296/193.07
(58) Field of Classification Search ........... 296/193.07, 296/181.2, 184.1, 204, 39.1, 39.2, 37.1–2, 296/37.14–16, 1.03
See application file for complete search history.

(56) References Cited

U.S. PATENT DOCUMENTS

| | | | |
|---|---|---|---|
| 2,131,746 A * | 10/1938 | Morrison | 414/463 |
| RE21,171 E * | 8/1939 | Biszantz | 298/1 R |
| 3,325,207 A | 6/1967 | Anderson et al. | 296/37.14 |
| 5,221,119 A * | 6/1993 | Emery | 296/39.2 |
| 5,257,846 A | 11/1993 | Kanai et al. | 296/37.14 |
| 5,636,890 A * | 6/1997 | Cooper | 296/37.1 |
| 5,890,758 A * | 4/1999 | Pone et al. | 297/15 |
| 6,322,658 B1 * | 11/2001 | Byma et al. | 156/309.9 |
| 6,918,625 B1 * | 7/2005 | Storto et al. | 296/65.09 |
| 2004/0100116 A1 | 5/2004 | Rhodes et al. | |
| 2005/0040677 A1 * | 2/2005 | Kamura et al. | 296/193.07 |

* cited by examiner

*Primary Examiner*—H. Gutman
(74) *Attorney, Agent, or Firm*—Quinn Law Group, PLLC; Christopher W. Quinn

(57) ABSTRACT

A tub is configured for attachment to a vehicle floor to receive a collapsed vehicle seat therein. The tub is formed from a laminated sheet structure including two layers of cold rolled steel having a viscoelastic layer therebetween spanning the entirety of both steel layers. The tub body has a rim, side walls extending downward from the rim, and a bottom supported by the side walls. The tub body is approximately 10" deep from the rim to the bottom. The laminated sheet structure has a bending rigidity between approximately 9.7 and 16.5 Nm to enable the forming of the side walls.

10 Claims, 1 Drawing Sheet

VEHICLE FLOOR TUB HAVING A LAMINATED STRUCTURE

TECHNICAL FIELD

The present invention relates to the vehicle floor tub including a laminated steel structure with a viscoelastic layer for sound deadening, where in the laminated structure has a desired bending rigidity to enhance manufacturability.

BACKGROUND OF THE INVENTION

Various prior art patents describe storage spaces that are provided beneath the vehicle floor. One example of a vehicle having a rear cargo space beneath the floor is described in U.S. Pat. No. 3,325,207. This patent describes a hidden cargo storage area which is designed into the body of the vehicle and is provided with a pivoting floor section which covers the hidden cargo storage area. The hidden cargo storage area is designed to accommodate a wheel and other cargo.

Similarly, U.S. Pat. No. 5,257,846 discloses a luggage space which is located behind a rear seat of a station wagon type vehicle.

U.S. Patent Application Publication 2004/0100116, to Rhodes et al, published May 27, 2004, and hereby incorporated by reference in its entirety, describes a vehicle seating structure which is foldable and collapsible for storage inside a tub which is disposed at least partially in a floor of the vehicle. Such a tub may be configured to conceal the second and third row passenger seats in a mini van. In this configuration, the tub must be strong enough to hold approximately 400 lbs. of weight, which limits the material selection to steel or other metal products. Due to the size of the collapsed seats to be stored in the tubs, substantial manufacturing challenges are presented in forming such a large stamped steel component.

Additionally, the shape of such a tub renders it susceptible to noise radiation which, if untreated, presents undesirably loud cabin noise which creates a poor environment for the driver and passengers. Traditional means for quieting automobiles would include mastics, doubler panels, spray-on deadener, fiberglass matting, etc. Each of these systems has its shortcomings.

Mastics are asphaltic patches which are attached to vertical metal surfaces and hardened during a heat-elevated painting process. Heat activated mastics are also used for damping resonances. Disadvantages of mastics include: build variations between vehicles due to manual placement; airborne paint contamination resulting in paint quality issues; labor required for installation; inconsistent melt characteristics; non recyclability; susceptibility to damage during installation; interior packaging limitations due to thickness of mastics; providing only localized damping; and assembly line space requirements.

Doubler panels include a stamped panel which is welded to a body structure panel. An expandable asphaltic material is sandwiched between the stamping and body structure components. The sandwiched material expands and hardens when processed through the vehicle paint shop. Disadvantages of this configuration include the additional tooling required to manufacture the doubler, the welding operation required for attachment, interior packaging limitations due to thickness of the doubler, and localized damping only in the area of the doubler panel.

Spray-on deadeners are sprayed treatments which are applied via a robot to the underbody structure sheet metal components on a vehicle. Spray-on deadeners provide a noise control barrier. Disadvantages of spray-on deadeners include: masking requirement for spray applications; non-recyclability; process limited by overspray and dripping; robot requirement for application; paint shop contamination; labor on assembly line space requirement; on-going maintenance of robots; and only localized dampening coverage.

Fiberglass matting provides fiberglass parts which are formed to the contour of the body component and attached during a vehicle assembly. These acoustic treatments are often used to reduce high frequency air-borne vehicle noise. Disadvantages of fiberglass matting include labor and assembly space requirements; fastener requirements; interior packaging limitations due to thickness; and the added expense and weight of the fiberglass parts.

DISCLOSURE OF THE INVENTION

The invention provides a tub for storage of collapsed seats beneath a vehicle floor which meets strength, noise and vibration, and packaging requirements.

More specifically, the invention provides a tub configured for attachment to a vehicle floor to receive a collapsed vehicle seat therein. The tub includes a tub body formed from a laminated sheet structure including two layers of cold rolled steel having a viscoelastic layer therebetween spanning the entirety of both steel layers. The tub body has a rim, side walls extending downward from the rim, and a bottom supported by the side walls. The rim is attachable to the vehicle floor. The tub body is at least approximately 10" deep from the rim to the bottom. The manufacture of such a large formed component is accomplished by providing the laminated sheet structure with a bending rigidity between approximately 9.5 and 16.5 Newton meters (Nm).

More preferably, the laminated sheet structure has a bending rigidity between approximately 11.7 and 15.7 Nm, and most preferably approximately 13.7 Nm.

The viscoelastic layer within the laminated sheet structure provides substantial noise and vibration damping such that the tub body is further characterized by the absence of sound deadening patches or other sound deadeners on the underside of the bottom of the tub body.

Preferably, the tub body has a thickness between approximately 1 mm and 1.3 mm, which corresponds with the laminate structure having a gauge of approximately 1 mm to 1.3 mm (0.042" to 0.048") prior to forming. The tub body, in one embodiment, may be at least approximately 50" wide and at least approximately 12" deep. The tub body is preferably configured to provide optimal damping of vibration between approximately 60° and 100° F.

The tub body further includes an electro-galvanized coating on each of the two layers of cold rolled steel for corrosion resistance. The invention also provides a method of forming a tub configured for attachment to a vehicle floor to receive a folded collapsible vehicle seat therein. The method includes: (a) providing a laminate sheet structure including two layers of cold rolled steel having a viscoelastic layer therebetween spanning the entirety of both steel layers, wherein the laminated sheet structure has a bending rigidity between approximately 9.5 and 16.5 Nm; and (b) cold forming laminated sheet structure into a tub body having a rim, side walls extending downward from the rim, and a bottom supported by the sidewalls, wherein the tub body is at least approximately 10" deep from the rim to the bottom.

The above features and other features and advantages of the present invention are readily apparent from the following description of the best mode for carrying out the invention when taken in connection with the accompanying drawings.

DETAILED DESCRIPTION OF THE PREFERRED EMBODIMENT

The present invention provides a tub which is used to store a collapsed vehicle seat beneath the floor a vehicle, as described, by way of example, in the above referenced U.S. Patent Application Publication 2004/0100116. The tub described herein maybe used in connection with the structure described in the above referenced U.S. Patent Publication (i.e. it would replace the tub 34 identified in the above referenced publication).

Figure 1:
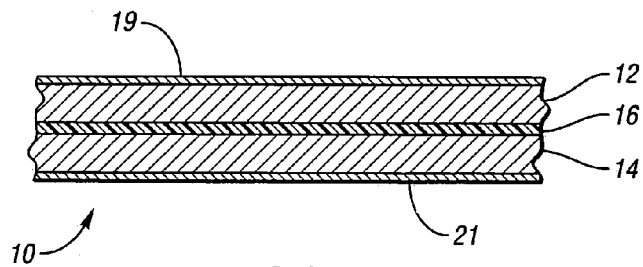
FIG. 1 shows a schematic cross sectional view of a laminated sheet structure for use with the present invention.

Specifically, the tub of the present invention is cold formed from a laminated sheet structure (a.k.a. constrained layer viscoelastic material) 10, as illustrated schematically in FIG. 1. This laminated sheet structure is available under the product name Quiet Steel® from Material Sciences Corporation of Farmington Hills, Mich. The laminated sheet structure 10 includes first and second cold rolled sheets of steel 12, 14 having an engineered viscoelastic layer 16 therebetween spanning the entirety of both steel sheets 12, 14. The laminated steel sheet structure 10 is preferably 0.042" to 0.048" (1.0 to 1.3 mm) thick prior to cold forming. The viscoelastic layer 16 is a plastic viscoelastic material which is designed to optimally damp vibration in a temperature range between 60° and 100° F., which are the typical operating temperatures of seat tub parts during normal vehicle operations.

An electro galvanized coating 19, 21 is provided on both of the cold rolled steel sheets 12, 14 for corrosion resistance.

By using the above referenced laminated sheet structure 10, significant improvements in noise and vibration reduction are achieved. Actual vehicle tests indicate that a vehicle floor configuration including the above described tub, in comparison to other commercially available vehicles, is up to 74% quieter than the comparison vehicles. This remarkable improvement in noise control is achieved by the laminated sheet structure.

Prior to development of this product, advanced stamping experts agreed that the manufacture of these large, deep tubs from a single sheet of steel would not be feasible. Also, the use of the laminated sheet structure in the formation of the tub in accordance with the present invention was initially met by substantial skepticism by those skilled in the art.

However, it was surprisingly discovered that laminated sheet structure having a bending rigidity between approximately 9.5 and 16.5 Nm provides the formability needed to enable manufacture of such a large, deep component. More preferably, bending rigidity between approximately 11.7 and 15.7 Nm is desired, with an optimal bending rigidity of approximately 13.7 Nm.

Bending rigidity for the laminated sheet structure is calculated using the RKU (Ross Kerwin Ungar) approach, which includes the following formula:

$$E = \frac{12(1-v^2)B_c}{t_c^3}$$

where $B_c$ is the bending rigidity in Nm, $v$ is the Poisson's ratio of the laminate, and $t_c$ is the total thickness of the laminate. Preferably, a 1.0 mm thick laminated sheet structure has a bending rigidity of 9.7 Nm (at 77° F. and 100 Hz), in comparison to a 1.0 mm thick solid steel sheet having a bending rigidity of 17.8 Nm (assuming a modulus of $2.0^{11}$ and Poisson's ratio of 0.28).

This bending rigidity results in desirable material flow properties and formability for successfully producing these parts.

The laminated sheet structure also achieves the desired weldability characteristics to accommodate spot welding and projection welding stubs.

Figure 2:
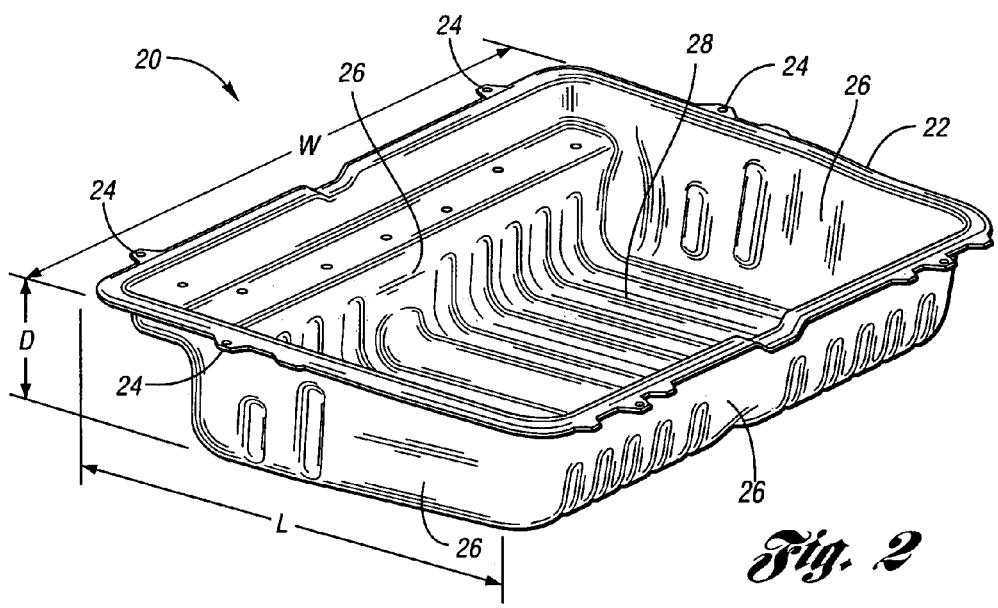
FIG. 2 shows a perspective view of a tub formed from the laminated sheet structure of FIG. 1 in accordance with the present invention.
Figure 3:
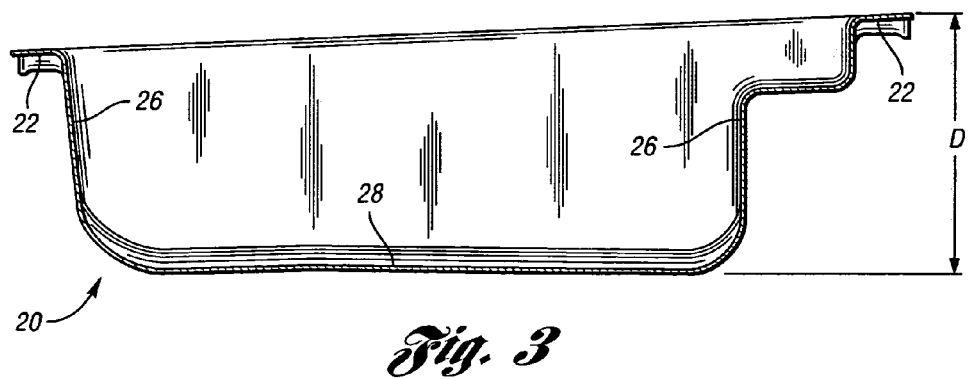
FIG. 3 shows a vertical cross sectional view of the tub of FIG. 2.

In a metal stamping operation, the laminated sheet structure 10, shown schematically in FIG. 1, is stamped to form the tub body 20 shown in FIGS. 2 and 3. The tub body 20 includes a rim 22 extending around the entire periphery of the body 20 to facilitate attachment to a vehicle floor. The rim 22 includes a plurality of attachment tabs 24 to facilitate such attachment. Side walls 26 extend downwardly from the rim 24, and a bottom 28 is supported by the side walls 26. Various corrugations or strengthening ribs are formed in the tub body 20 for added strength.

Referring again to FIGS. 2 and 3, the tub body 20 may be at least approximately 10 to 12" in depth between the rim 22 and the bottom 28 of the tub body 20. This substantial depth D is achieved as a direct result of the laminated steel structure 10 having the above described bending rigidity. The tub body 20 may have a width W of at least 50", and a length L of at least 33" (i.e., sufficiently wide and deep to receive a folded vehicle seat entirely therein).

Based upon a standard cantilever, weighted deflection test, the laminate structure 10 shown in FIG. 1 will deflect approximately 1.5 to 3.2 times more in distance than solid steel having the same size and thickness with the same deflection weights.

While the best mode for carrying out the invention has been described in detail, those familiar with the art to which this invention relates will recognize various alternatives designs and embodiments for parts in the invention or from the scope of the appended claims.

The invention claimed is:

1. A tub configured for attachment to a vehicle floor to receive a collapsed vehicle seat therein, the tub comprising:
   a tub body formed from a laminated sheet structure including two layers of cold rolled steel having a viscoelastic layer therebetween spanning the entirety of both steel layers, said tub body having a rim, side walls extending downward from the rim, and a bottom supported by the side walls, said tub body being at least approximately 10 inches deep from said rim to said bottom;
   wherein said laminated sheet structure has a bending rigidity between approximately 9.5 and 16.5 Newton meters to enable said forming of said side walls.

2. The tub of claim 1, wherein said laminated sheet structure has a bending rigidity between approximately 11.7 and 15.7 Newton meters.

3. The tub of claim 2, wherein said laminated sheet structure has a bending rigidity of approximately 13.7 Newton meters.

4. The tub of claim 1, wherein said tub body is further characterized by the absence of sound deadening patches or other sound deadeners on an underside of said bottom.

5. The tub of claim 1, wherein said side walls are between approximately 1.0 and 1.3 mm thick.

6. The tub of claim 1, wherein said tub body is at least approximately 50 inches wide and at least approximately 12 inches deep.

7. The tub of claim 1, wherein said tub body is configured to provide optimal damping of vibration between approximately 60 and 100 degrees F.

8. The tub of claim 1, further comprising an electrogalvanized coating on each of said two layers of cold rolled steel for corrosion resistance.

9. A tub configured for attachment to a vehicle floor to receive a collapsed vehicle seat therein, the tub comprising:
 a tub body formed from a laminated sheet structure including two layers of cold rolled steel having a viscoelastic layer therebetween, said tub body having a rim, side walls extending downward from the rim, and a bottom supported by the side walls, said tub body being at least approximately 10 inches deep from said rim to said bottom;
 wherein said laminated sheet structure has a bending rigidity between approximately 11.7 and 15.7 Newton meters to enable said forming of said side walls;
 wherein said tub body is at least approximately 50 inches wide and at least approximately 12 inches deep; and
 wherein said tub body is further characterized by the absence of sound deadening patches or other sound deadeners on an underside of said bottom.

10. The tub of claim 9, wherein said tub body is sufficiently deep to receive the entire collapsed vehicle seat therein.

* * * * *